Patented Nov. 22, 1938

2,137,674

UNITED STATES PATENT OFFICE 2,137,674

PROCESS FOR MAKING DOUBLE OR TREBLE CALCIUM AND MAGNESIUM SUPERPHOSPHATE

Walter H. MacIntire, Knoxville, Tenn.

No Drawing. Application February 14, 1934, Serial No. 711,289

9 Claims. (Cl. 23—109)

This invention relates to the manufacture of double or "treble" calcium and magnesium superphosphate.

Heretofore, the double or "treble" superphosphate of commerce has been solely a calcium product manufactured by the treatment of phosphate rock with a solution of phosphoric acid. Phosphate rock is so essentially a calcium phosphate—there being present therein only negligible traces of bases other than calcium—that the phosphate rock is commercially evaluated on the quantity of "B. P. L.", that is, bone phosphate of lime, computed from the determined $P_2O_5$ content of the rock.

Research of recent years has developed the fact that in many sections, and particularly for certain crops, there is a distinct need of magnesium as a component of fertilizers, and as a feasible and economic method of assuring to the immediate crop the requisite amount of magnesium, it has been the practice to include in the fertilizer a certain amount of magnesium sulfate, further and substantial need of magnesium being provided for by either a joint or separate incorporation of dolomite. The desirability of a concentrated mixture of the highly soluble and mobile water-soluble magnesium phosphate and water-soluble calcium phosphate as a fertilizer has been recognized, but until now no feasible economic method of producing this product has been known.

One object of the present invention is to secure a phosphatic fertilizer, concentrated in its principal components, phosphoric acid ($P_2O_5$), magnesium and calcium by producing a product that is comprised of intimately mixed substantially equivalent quantities of water-soluble magnesium phosphate and water-soluble calcium phosphate, and the invention consists in the process by which this result is secured and the product resultant from the practice of said process.

It has been discovered that with proper conditions, (fineness of comminuted dry dolomitic limestone, concentration of the solution of phosphoric acid ($H_3PO_4$), time and nature of agitation, together with proper subsequent curing and/or drying) a superior and new "treble" superphosphate product can be secured, consisting essentially of an intimate mixture of the mono-phosphates of magnesium and of calcium with no determinable quantity of the di-phosphates of these two elements, and with negligible quantities of residual unreacted dolomitic material and "free" phosphoric acid. This insures a non-deliquescent, concentrated compound that is stable in the atmosphere and one that can be transported economically to the point of usage, where it may be "cut" or diluted with dolomitic limestone without producing any citrate-insoluble forms of $P_2O_5$, and hence causing no decrease in the "availability" of its components.

The process has the further advantage that it can be carried out without the necessity of extensive equipment and without requiring technical knowledge on the part of the operators, the only values required being the purity of the starting materials, (dolomite or other dolomitic limestone and phosphoric acid), and these values are furnished by the producers of said starting materials. A still further advantage of the process is found in that it does not generate the obnoxious gases that are expelled when the standard type of calcium superphosphate is made by reaction between phosphate rock and phosphoric acid. Furthermore, the present invention can be carried out, if desired, in a closed system, whereby a substantial amount of carbonic acid ($CO_2$) may be obtained as a by-product. When a ground dolomite or other dolomitic limestone coarser than 40-mesh is added to a highly concentrated solution of phosphoric acid, no appreciable immediate reaction transpires, but it has been determined, according to the present invention, that if dolomitic particles much smaller than 40-mesh are used there will result a speedy initiation of a reaction or reactions that continue practically to a theoretical extent. The reactions involved and the resultant components of the product are indicated by the following equations:

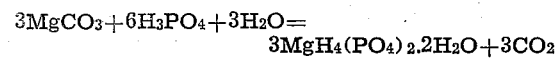

It thus appears that 300 $CaCO_3$-equivalent units of dolomitic limestone, jointly accounted for by the calcium and magnesium carbonates, require 587.85 units of absolute $H_3PO_4$. Although the reaction would seem to indicate that the addition of water is required for the hydration of the mono-magnesium phosphate formed, no water is added as such, under the present invention, since the amount of $H_2O$ required by the mono-magnesium phosphate is supplied by the amount of water contained in the phosphoric acid of the concentration to be stipulated. It also appears that the amount required for the formation of mono-calcium phosphate is generated by the reaction between calcium carbonate and phosphoric acid.

Generally stated the process consists in adding comminuted dolomite or other dolomitic limestone to a highly concentrated solution of phosphoric acid preferably while agitating the acid and continuing to agitate the mixture.

The dolomite or other dolomitic limestone is preferably comminuted to pass a 100 mesh sieve and a material portion to pass a 200 mesh sieve, though if a minor fraction is coarser than 100 mesh it will not materially affect the operation of the process, but will somewhat increase the time element. Thus if all of the dolomitic charge was comminuted to pass a 40 mesh sieve and approximately two third of it to pass a 100 mesh sieve, favorable results would be secured. By preference approximately an 85% concentration of phosphoric acid is used though a concentration anywhere between 65% and 90% may be employed if desired. However, the use of a phosphoric acid solution below 80% (effected by the addition of water to a higher concentration) is not as advantageous as the higher (80% to 90%) concentration because of the activity of the lower concentrations upon metals, in contra-distinction to the inactivity upon metals by the higher concentration, and furthermore, because of the attendant unnecessary amount of water that must be dispelled either by extended air drying or by heat, whereas no heat is required for drying the product obtained by the use of the higher concentration.

Heretofore it has been proposed, in British Patent No. 336,651, of October 15, 1930, to attack directly "natural dolomite (constituted approximately by equimolecular proportions of calcium carbonate and magnesium carbonate) by phosphoric acid free of any combination so as to prepare a calcium-magnesium phosphate adapted to be used as fertilizer" and "with the accessory addition of ammonia." But that patent does not disclose the type nor characteristics of phosphates produced, their solubility and/or "availability", the fineness of the dolomite employed, or in fact if the dolomite is comminuted at all, the concentration of phosphoric acid, the proportion of dolomite to phosphoric acid, whether the acid is added to the dolomite or vice versa, or the period and type of agitation and subsequent curing, ageing and/or drying operations. Furthermore, from the single analysis given of the product obtained by the "necessary addition of ammonia", it is evident that the material could not be a mixture of the mono-phosphates of calcium and magnesium.

In practicing the present invention it is preferred to proceed as follows:

Approximately 683 parts by weight of 85% (85.65) cold phosphoric acid ($H_3PO_4$) are placed in a suitable container and agitated. The mixer may be composed of any convenient metal or even wood, since at the prescribed concentration of phosphoric acid there is only a negligible reaction exerted by the phosphoric acid upon metal or wood. The volume of the container should be at least 2½ times that of the acid charge, and should be provided with a suitable stirrer or agitating device capable of thoroughly mixing the reacting materials. The combined container and agitating device may be of the continuously operating or of the batch type. Any suitable mixer of either one of these types may be employed. To the agitated charge of concentrated phosphoric acid is added, by gravity, 300 $CaCO_3$-equivalent parts by weight of finely-ground dry dolomite or other dolomitic limestone and the agitation continued until the mass assumes the consistency of a thick batter at which stage it is delivered in any suitable way to a bin or pile where it continues to thicken until it ultimately assumes a porous "set." The value of the dolomitic charge added can be determined conveniently by the solution-titration procedure and computed to the "total neutralizing power" in terms of $CaCO_3$-equivalence. The above value for phosphoric acid represents an amount .5% less than that theoretically required, but reasonable divergence from this value may be practiced without materially affecting the product. To insure a uniform composition of a large bulk of the finished product built up by the accumulation of a series of unit productions added to form a large pile or bin of the product, each unit operation should be of consistently uniform composition. Hence, it is essential that the fineness of the dolomitic limestone shall be such as to insure a uniform dissemination of the undecomposed particles throughout the batter-like sludge at the time when the viscous sludge is delivered from the mixer to either the bin, or pile for curing, during which step the particles not immediately decomposed will undergo decomposition. If, in the dolomitic charge, there were substantial quantities of particles so coarse as to settle out from suspension before the set-up can ensue, the desired uniformity in the composition of the large bulk or cumulative pile would not be attained. Furthermore, the reaction between the coarser particles of a dolomitic charge, containing substantial proportions of such coarser particles, and the phosphoric acid is so slow and extended as to give a material that, unless cured or aged for a longer period than desirable, will contain undesirable localized residues of undecomposed rock and of free phosphoric acid, which condition results in a slow-drying hygroscopic product.

From numerous experiments it has been determined that for dolomitic limestones in general the preferred fineness of comminution is 200-mesh, although a 100-mesh product that contains approximately one half of 200-mesh material is admirably suited for the operation of the process. The use of a dolomitic rock ground to an exceeding fineness, such as 325-mesh, causes an intense initial activity, a large bulk, and a product so honeycombed that the final ground product is decidedly light and fluffy, but it carries certain advantages in that the reaction with $H_3PO_4$ is expedited and the product dries rapidly because of its distinct honeycomb structure.

With different types of dolomitic limestone and with varying calcium:magnesium ratios, somewhat different activities occur. It is desirable, though not essential, to employ a dolomitic product of a purity of at least 95% $CaCO_3$-equivalence and a Ca:Mg molar ratio of approximately 5 to 4. With unusually pure dolomites, that is, rocks of high purity and a Ca:Mg molar ratio of 1 to 1, the exceedingly high solubility of the mono-magnesium phosphate content of the finished product will tend to slow up the drying operation, when the drying is carried out spontaneously and especially if the surface of the mass is not scored or scarrified during the drying process. In such instances it is advantageous to add to and mix with the dolomite from 5% to 10% of a high-calcic limestone before the addition of the dolomite-limestone mixture to the phosphoric acid, and periodically to disrupt the surface of the bulk of treble superphosphate during the curing process.

Subsequent to the gravity-delivery of the full charge of dolomitic material into the agitated concentrated solution of $H_3PO_4$, the mixing operation is continued for a period usually varying between ten and twenty minutes. The period of agitation will depend upon the type, purity, Ca:Mg molar ratio and fineness of the specific dolomite or other dolomitic limestone, and type of mixer and concentration of the $H_3PO_4$, but the limits given have been found to secure attainment of the desired condition of the mixture, to wit, a pourable, viscous slurry, sludge, or batter, sufficiently thickened and gas-distended to insure that the intially-undecomposed and uniformly-disseminated fraction of the dolomitic charge will be maintained uniformly distributed throughout the body of the mixture during the few minutes required for the viscous mixture to undergo a "set" or solidification into a homogeneous mass after being poured from the mixer. At the conclusion of the mixing operation, the viscous sludge, or batter, is transferred to bins or to piles in which the reaction between the undisintegrated fraction of the dolomitic charge and the phosphoric acid proceeds practically to completion, on "curing." After transfer to the bins or to the piles, the viscous gas-distended sludge thickens rapidly and the continued evolution of $CO_2$ insures a distinctly porous, honeycombed mixture that may be permitted to cure for a convenient period without the necessity of artificial drying. If, however, the finished product is desired quickly, the moist material may be aged overnight and then dried by any of the conventional drying methods.

As an example of the product obtained by the use of 321.2 parts of 200-mesh dolomitic limestone (93.4% $CaCO_3$-equivalence), 682.9 grams of 85.65% $H_3PO_4$ (.5% less than theory), with twelve minutes stirring, and a two-week period of ageing or curing, there has been secured 805.2 parts of a product that contained 52.52% total $P_2O_5$ all of which was water-soluble; 0.46% "free" $P_2O_5$; 1.50% carbonates as $CaCO_3$-equivalence; and 2.15% moisture. That is, the product is a treble superphosphate containing approximately 50% to 55% mono-calcium phosphate and 40% to 45% mono-magnesium phosphate. As a further example, 6.66 pounds of 97.1% $CaCO_3$-equivalent 200-mesh Knox dolomite was mixed with 15 pounds of $H_3PO_4$ (85.65%) and agitated for twenty minutes, after which the mixture, of a "batter" consistency, was transferred to a suitable bin where it was allowed to stand for seven days. On analysis, the product thus obtained showed a 50.45% content of $P_2O_5$, all of which was "available"; 2.31% "free" $P_2O_5$; 3.63% $CaCO_3$-equivalence of carbonates; and 4.92% moisture. After a further period of two weeks the "curing" or aging process reduced the "free" $P_2O_5$ to 1.49% and the $CaCO_3$-equivalent carbonate content to 2.52%.

By the use of a white Georgia dolomite and a high-grade 85% phosphoric acid, there has been secured a product comprising only .54% dolomitic residue with only 1.42% free $P_2O_5$. When computed to a value that permits of direct comparison, this product was equivalent to a mono-calcium phosphate, or the present standard double or "treble" superphosphate of 96.54% purity on the air-dried basis, or 98.5% moisture free basis, when allowance is made for the low moisture content of 2%.

Having thus described the invention, what is claimed is:

1. The process which consists in adding comminuted dolomitic limestone of 100-mesh fineness, to phosphoric acid of approximately 85% concentration, and agitating the mixture.

2. The process which consists in adding comminuted dry dolomitic limestone or dolomite of 100-mesh fineness, to agitated phosphoric acid of approximately 85% concentration, and agitating the mixture.

3. The process which consists in adding comminuted dolomitic limestone, all passing through a sieve between approximately 100-mesh and approximately 200-mesh, to phosphoric acid of approximately 85% concentration, and agitating the mixture.

4. The process which consists in taking dolomitic limestone having a neutralizing value equivalent to 95% $CaCO_3$ or more, a Ca:Mg molecular ratio of approximately 5 to 4, and of a fineness to pass a 100-mesh sieve, adding the dolomitic charge to phosphoric acid of approximately 85% concentration and agitating the mixture until it assumes the condition of a viscous slurry, or batter.

5. The process which consists in taking dolomite in which the magnesium content closely approximates the calcium content in molar equivalence, and all of a fineness to pass a 100-mesh and approximately one half of fineness to pass a 200-mesh sieve, adding the same to phosphoric acid of approximately 85% concentration and agitating the mixture until it reaches the condition of a viscous sludge, or batter.

6. The process which consists in adding comminuted dolomitic limestone to an agitated phosphoric acid solution of approximately 85% concentration, substantially all the dolomitic charge being of a fineness to pass a 100-mesh and at least one half of it passing a 200-mesh sieve, uniformly distributing the dolomitic charge in the acid by agitation, and continuing the agitation until the mixture becomes sufficiently thickened to maintain the uniform distribution of any initially undecomposed limestone throughout the mass.

7. The process which consists in placing in a container phosphoric acid of a concentration between 65% and 90%, adding thereto dolomitic limestone comminuted so that substantially all will pass a 100-mesh sieve, uniformly distributing the dolomitic charge in the acid by agitation, and continuing the agitation until the mixture becomes sufficiently thickened to maintain the uniform distribution of any initialy undecomposed fraction of the dolomitic charge.

8. The process which consists in adding dolomitic limestone comminuted to pass a 40-mesh sieve and approximately 65% thereof to pass through a 100-mesh sieve, to a phosphoric acid solution of between 65% and 90% concentration, and agitating the mixture.

9. The process which consists in adding comminuted dolomitic limestone, of a fineness to pass a 40-mesh sieve and approximately 65% to pass a 100-mesh sieve to a phosphoric acid solution of a concentration between 65% and 90%, agitating the mixture until it reaches a thick batter-like condition, and then leaving the same quiescent to complete the reaction.

WALTER H. MacINTIRE.